US010367876B2

(12) United States Patent
Chen et al.

(10) Patent No.: US 10,367,876 B2
(45) Date of Patent: Jul. 30, 2019

(54) ENVIRONMENTALLY ADAPTIVE AND SEGREGATED MEDIA PIPELINE ARCHITECTURE FOR MULTIPLE STREAMING SESSIONS

(71) Applicant: Avast Software s.r.o., Prague (CZ)

(72) Inventors: David Chih-Yuan Chen, Sunnyvale, CA (US); Jose Luis Ferras Pereira, San Mateo, CA (US); Pablo German Sole, San Mateo, CA (US)

(73) Assignee: AVAST SOFTWARE S.R.O., Prague (CZ)

( * ) Notice: Subject to any disclaimer, the term of this patent is extended or adjusted under 35 U.S.C. 154(b) by 301 days.

(21) Appl. No.: 15/385,110

(22) Filed: Dec. 20, 2016

(65) Prior Publication Data

US 2017/0180449 A1    Jun. 22, 2017

Related U.S. Application Data

(60) Provisional application No. 62/270,342, filed on Dec. 21, 2015.

(51) Int. Cl.
*G06F 15/167* (2006.01)
*H04L 29/06* (2006.01)
(Continued)

(52) U.S. Cl.
CPC ............ *H04L 65/80* (2013.01); *G06F 3/14* (2013.01); *G06F 3/1423* (2013.01); *G09G 5/005* (2013.01);
(Continued)

(58) Field of Classification Search
CPC . H04L 65/80; H04L 43/0876; H04L 43/0882; H04L 65/4069; G06F 3/14;
(Continued)

(56) References Cited

U.S. PATENT DOCUMENTS

2003/0026207 A1* 2/2003 Loguinov ............... H04L 47/10
370/235
2010/0195488 A1* 8/2010 Mehrotra .............. H04L 1/0002
370/216

(Continued)

FOREIGN PATENT DOCUMENTS

WO     2013155234 A1   10/2013

OTHER PUBLICATIONS

Wiegand et al., Overview of the H.264/AVC Video Coding Standard, IEEE Transactions on Circuits and Systems for Video Technology, Jul. 2003, pp. 560-576, vol. 13, Issue No. 7.
(Continued)

*Primary Examiner* — Liang Che A Wang
*Assistant Examiner* — Johnny B Aguiar
(74) *Attorney, Agent, or Firm* — Husch Blackwell LLP

(57) ABSTRACT

Systems and methods monitor a system including a remote desktop, a trusted mobile instance, and a delivery handler. The delivery handler can determine if the system is overloaded and to take the appropriate measures to maintain a negotiated minimal QoS and adapt as necessary when the conditions vary. Additionally, the systems and method can address security issues by separating privileges that are typically bundled together in conventional systems, and by applying isolation mechanisms to exposed areas of the system.

15 Claims, 5 Drawing Sheets

(51) Int. Cl.
*G06F 3/14* (2006.01)
*G09G 5/00* (2006.01)
*G09G 5/391* (2006.01)
*H04L 12/24* (2006.01)

(52) U.S. Cl.
CPC ......... H04L 65/4069 (2013.01); *G09G 5/001* (2013.01); *G09G 5/391* (2013.01); *G09G 2358/00* (2013.01); *G09G 2360/02* (2013.01); *G09G 2360/18* (2013.01); *G09G 2370/025* (2013.01); *G09G 2370/10* (2013.01); *H04L 41/5009* (2013.01)

(58) Field of Classification Search
CPC ...... G06F 3/1423; G09G 5/005; G09G 5/391; G09G 5/001; G09G 2370/10; G09G 2360/18; G09G 2358/00; G09G 2360/02; G09G 2370/025
USPC ....... 709/203, 212, 217, 219, 224, 231, 232, 709/233, 235
See application file for complete search history.

(56) References Cited

U.S. PATENT DOCUMENTS

| | | | |
|---|---|---|---|
| 2010/0303146 A1* | 12/2010 | Kamay | H04N 21/2343 375/240.02 |
| 2012/0283017 A1 | 11/2012 | Ahiska et al. | |
| 2013/0060886 A1* | 3/2013 | Wynn | H04L 67/08 709/217 |
| 2013/0198794 A1 | 8/2013 | Dharmapurikar | |
| 2013/0210522 A1 | 8/2013 | Dharmapurikar | |
| 2014/0136686 A1* | 5/2014 | Tsai | H04L 43/08 709/224 |
| 2014/0143297 A1* | 5/2014 | Ibarria | H04L 65/60 709/203 |
| 2014/0314139 A1* | 10/2014 | Xia | H04N 19/115 375/240.02 |
| 2015/0082456 A1 | 3/2015 | Eren et al. | |
| 2016/0219126 A1* | 7/2016 | Oh | H04L 67/42 |

OTHER PUBLICATIONS

Bankoski et al., VP8 Data Format and Decoding Guide, RFC 6386, Nov. 2011, pp. 1-304.

Sullivan et al., Overview of the High Efficiency Video Coding (HEVC) Standard, IEEE Transactions on Circuits and Systems for Video Technology, Dec. 2012, pp. 1649-1668, vol. 22, Issue No. 12.

Popek et al., Formal Requirements for Virtualizable Third Generation Architectures, Communications of the ACM, Jul. 1974, pp. 412-421, vol. 17, Issue No. 7, Association for Computing Machinery, Inc.

Kamp et al., Building Systems to be Shared Securely, Queue, Jul./Aug. 2004, pp. 42-51.

* cited by examiner

ENVIRONMENTALLY ADAPTIVE AND SEGREGATED MEDIA PIPELINE ARCHITECTURE FOR MULTIPLE STREAMING SESSIONS

CROSS-REFERENCE TO RELATED APPLICATIONS

This application claims priority to U.S. Provisional Patent Application Ser. No. 62/270,342, filed on Dec. 21, 2015, to David Chih-Yuan Chen, Jose Luis Ferras Pereira, and Pablo German Sole, entitled "Environmentally Adaptive and Segregated Media Pipeline Architecture for Multiple Streaming Sessions,", the entire disclosure of which is incorporated herein by reference.

FIELD

The disclosure relates generally to media streaming, and more particularly, to an environmentally adaptive and segregated media pipeline architecture for multiple streaming sessions.

BACKGROUND

With the advancements in mobile phone and cellular network technology, numerous electronic devices can now be used for web browsing, reading online documents and watching multimedia through the Internet. However, due to the inherent network limitations and complications of data security, downloading and storing data on the devices with a smooth user experience cannot typically be utilized without sacrificing the security of the data.

It is generally accepted that for applications that manage critical data, a remote streaming solution shall be utilized. As a non-limiting example, healthcare institutions have to be Health Insurance Portability and Accountability Act of 1996 (HIPAA) compliant, to prevent healthcare fraud and abuse. Although it is not necessarily imposed that these institutions use remote desktop infrastructures, it is regarded as the de-facto standard due to its ease of installation and management, while maintaining very high standards when it comes to security.

In regards to remote desktop/mobile streaming technologies, traditional solutions use tile-based protocols, such as Virtual Network Computing (VNC) or Remote Desktop Protocol (RDP). These technologies typically use relatively simple screen scraping algorithms, e.g. when there is a change of the remote frame buffer, the protocol will encode that information using an image encoder (e.g. JPEG, PNG), and send it over the network.

As the number of clients that are simultaneously connected to the server increases, it becomes more complicated to deliver reliable data towards each client. This can be especially true for real-time interactive streaming. In environments where remote desktops are used, it is not typically possible to pre-encode the video streams or take advantage of segmented retrieval mechanisms as is done in modern media streaming protocols.

Another issue is the security of media streaming architectures. Typically, remote access streaming handlers are deeply integrated into highly privileged areas of the guest operating system (OS), either as a kernel driver or as a system service that bundles together privileges needed for screen scraping and network access.

SUMMARY OF THE INVENTION

Systems and methods for providing an adaptive media pipeline enable (i) receiving a connection request from an endpoint device, (ii) in response to receiving the connection request, establishing a remote desktop, a trusted mobile instance, and a delivery handler, (iii) retrieving, by the trusted mobile instance, media content of the remote desktop, (iv) sharing the media content with the delivery handler, (v) determining, by the delivery handler, quality of service parameters; and (vi) providing the media content to the endpoint device in accordance with the quality of service parameters.

BRIEF DESCRIPTION OF THE DRAWINGS

For a better understanding of the inventive subject matter, reference may be made to the accompanying drawings in which.

DETAILED DESCRIPTION

Figure 1:
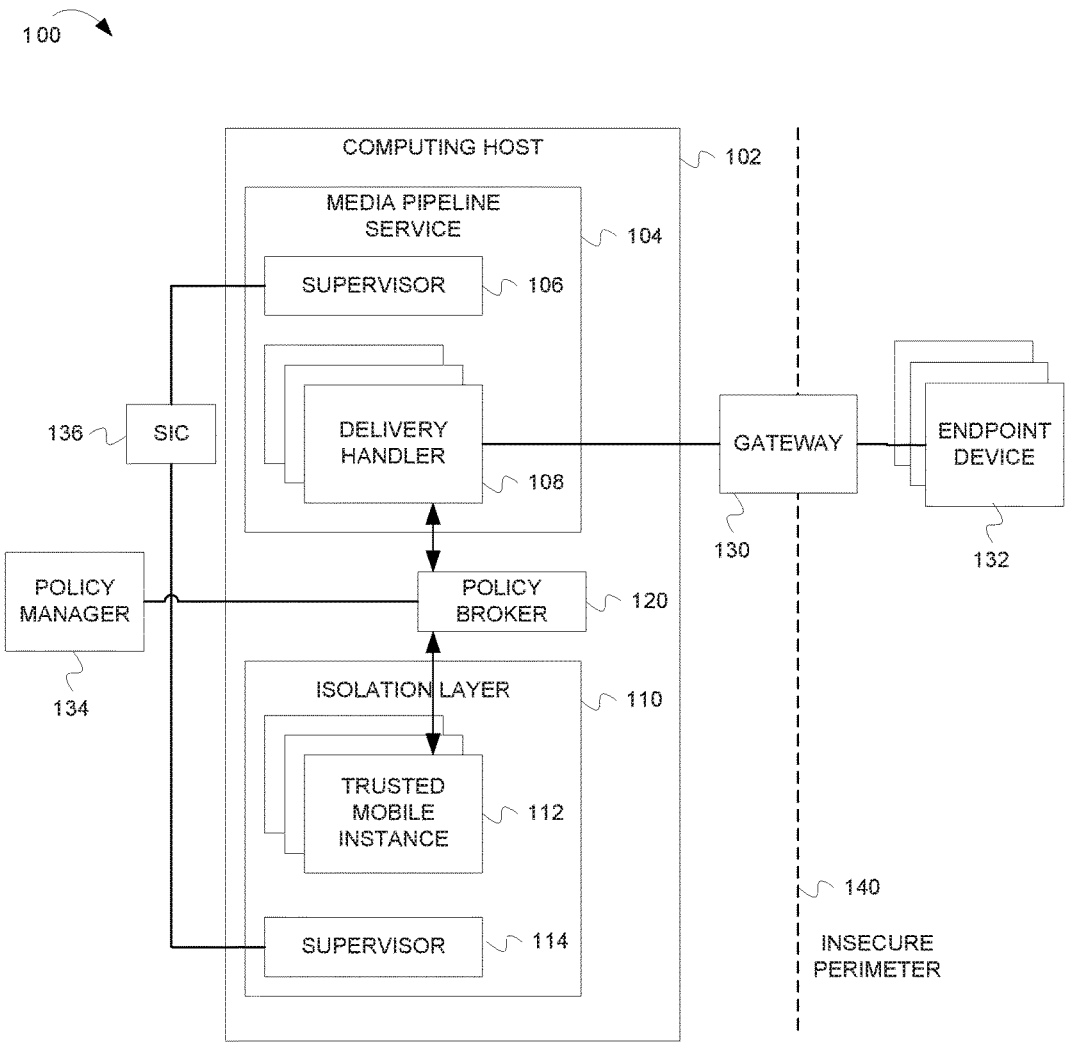
FIG. 1 is a block diagram of a system including a media pipeline architecture according to embodiments.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Various aspects of the inventive subject matter include a feedback loop mechanism between a media transport and the media generator, so that the latter can be dynamically instructed to adjust its generation parameters, thus offering a better opportunity for optimization of the overall media presentation pipeline. In some embodiments, systems and methods monitor a whole system, and allow client handlers to determine if the system is overloaded and to take the appropriate measures to maintain a negotiated minimal quality of service (QoS) and adapt as necessary when the conditions vary. Additionally, the systems and method described herein can address security issues by separating privileges that are typically bundled together in conventional systems, and by applying isolation mechanisms to exposed areas of the system.

FIG. 1 is a block diagram of a system 100 including a media pipeline architecture according to embodiments. In some embodiments, system 100 includes a computing host 102, a gateway 130, an endpoint device 132, a policy manager 134 and a session initiation controller 136.

Computing host 102 can include one or more processors, memory, and various input/output (I/O) peripherals along with associated software services and processes to encode and transport various types of media, including video, audio and multimedia content. In some embodiments, computer host 102 can include one or more trusted mobile instance 112 and a media pipeline service 104. A trusted mobile instance (TMI) 112 can include a group of processes that run in an isolation layer 110 such that the group of processes are segregated from other processes that may be running within the computing host 102, but that shares computing resources such as memory, processors and other IO devices with other groups. A TMI can be implemented using different virtualization technologies like hypervisors, emulators and operating-system level virtualization. The isolation layer 110 enables the computing host 102 to execute multiple TMIs 112. A TMI 112 can be implemented using a remote desktop architecture, in which case the group of processes of TMI 112 can be a fully functional operating system that is remotely accessed from an endpoint device 132, and is further controlled by proxying the video/audio and sensors components of the TMI. Thus, it allows the TMI to be controlled in much the same way as if it were running locally relative to the endpoint device 132. In some aspects, a TMI supervisor 114 starts a TMI 112, and makes sure the TMI 112 is available and running while the TMI 112 is needed.

A media pipeline service (MPS) 104 can be a management and monitoring service that creates and assigns a delivery handler 108 process to an incoming endpoint device 132 connection. The MPS 104 can monitor the state of a delivery handler 108 and can take corrective actions when needed. These corrective actions assure, but are not limited to, fault tolerant deployment and high-availability. For example, the MPS 104 may detect that the current server processor is overloaded and thus destroy any corresponding delivery handler 108 as it deems necessary. The MPS 104 can also verify that the remote client connection to endpoint device 132 is alive and that the network credentials provided by an endpoint device 132 are correct.

Delivery handler 108 can be a standalone program instantiated by MPS 104 that receives remote client connections from an endpoint device 132 and sets up a communication channel between a TMI 112 and the remote client endpoint device 132. In some aspects, a supervisor 106 component of MPS 104 starts new delivery handlers 108 and makes sure a delivery handler 108 is kept alive while there is client connected to it. The communication channel can receive image frame buffers from the TMI 112, encode them into a video stream, and sends the encoded frame buffers in the video stream to the client endpoint device 132 using a predefined transmission protocol. The delivery handler 108 can also take care of processing audio streams from the TMI 112 in a similar fashion and prepare it for transmission to the client endpoint device 132. The delivery handler 108 can include a combination of various processing modules such that each module is independent and interchangeable depending on the remote client hardware/software capabilities and network conditions. For example, a delivery handler 108 can include a video scaler in the delivery handler pipeline which can be activated to overcome issues associated with lower bandwidth networks. The modularization of the components inside the delivery handler 108 allows codecs (encoder/decoder) or processing filters to be updated or replaced independently without affecting other components of the delivery handler 108. The delivery handler 108 can also exchange control packets sent between an endpoint device 132 and the corresponding TMI 112. These control packets, also called messages, can be used to define setup parameters for a TMI 112 and to drive the functioning of the TMI 112 from an endpoint device 132, for example by starting a new foreground process when an endpoint device 132 requests it. In some aspects, the foreground process is a remote application running on a desktop presented to an endpoint device 132

An endpoint device 132 can be any device that receives a media stream from a delivery handler and displays it to the user. For example, an endpoint device can be a desktop computer, a laptop computer, tablet computer, smart phone or any other device with a processor that is capable of receiving a media stream and presenting the media stream. As a non-limiting example, in the case that the stream is a remote desktop stream, the endpoint device 132 can additionally allow the user to interact with the stream using the available input devices on the endpoint device 132 such as a keyboard and mouse, which are proxied back to the TMI 112 associated with the endpoint device 132.

Figure 2:
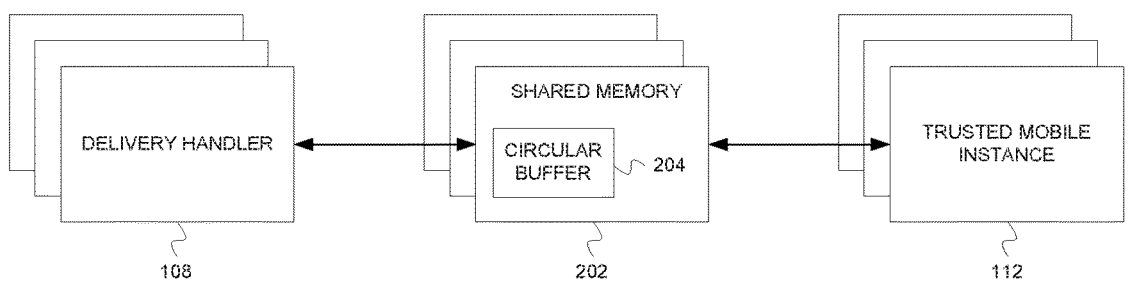
FIG. 2 is a block diagram illustrating a relation of a delivery handler with a trusted mobile instance.

FIG. 2 is a block diagram illustrating a relation of a delivery handler with a trusted mobile instance. In some embodiments, a delivery handler 108 and a TMI 112 can be interconnected via a shared memory block 202. In some embodiments, a circular buffer 204 inside the shared memory block 202 that interconnects the TMI 112 is used to share the video or audio frames generated by TMI 112 with the delivery handler 108 that resides on the computing host 102. In some embodiments, TMI 112 utilizes a process typically referred to as screen scraping to obtain screen data rendered by the TMI 112. The use of shared memory block 202 can assure that a clean separation exists between the TMI 112 environment and the computer host 102. Thus, in some embodiments, there is no need to run the delivery handler 108 as a highly privileged process. Once the connection between a TMI 112 and the MPS 104 is established and communication mechanisms to the TMI are initiated, a highly restricted and low privileged delivery handler 108 process is started. Furthermore, the use of a circular buffer 204 within the shared memory block 202 allows an efficient implementation that can avoid expensive memory copy operations while leveraging all hardware assisted optimizations available on the computing host 102 machine, including but not limited to video streaming instruction sets and graphic processors of computing host 102.

Returning to FIG. 1, the network transport protocol utilized inside the delivery handler 108 and the endpoint device 132 can allow feedback between the endpoint device 132 and its connected delivery handler 108. The feedback information can include the connected network condition such as bandwidth, latency, and packets dropped. Using this feedback information, the delivery handler 108 can adapt to any network limitations through adjusting the frame rate, resolution, and encoding bitrate. Additionally, duplicate frames can be dropped when severe packet loss has been detected. In some aspects, the endpoint device 132 can periodically report corrupted or dropped packets that have been detected.

Session initiation controller (SIC) 136 can be decision process hosted on a same or different computing host from computing host 102. SIC 136 can trigger and request MPS 104 to spawn a new delivery handler instance. For example, SIC 136 can communicate with supervisors 106 and 114 to request a TMI 112 and delivery handler 108 be created. The session initiation protocol used by SIC 136 can use any session initiation protocol now known or developed in the future to initiate a session between an endpoint device 132 and its associated delivery handler 108.

In some aspects, an endpoint device 132 requests a connection be initiated through a session request service (not shown). The session request service can route the request to SIC 136, and inform the endpoint device 132 that a session is being initiated. When the MPS 104 is signaled that an endpoint device 132 is requesting the new connection by the SIC 136, MPS 104 creates a shared memory block 202 (FIG. 2) to store the circular buffer 204 (FIG. 2) used for screen scraping. MPS 104 sends a message to the corresponding TMI 112 to inform it to start copying the screen contents of screens rendered by TMI 112 into the shared memory block 202. The newly instantiated TMI 112 can be specialized to an associated user. For example, in addition to code common to TMIs, a TMI 112 can access a datastore (not shown) that stores personal documents, pictures, personal accounts information, etc. Once the message passing transport to the TMI 112 is initialized and its shared memory block created, the MPS 104 creates a delivery handler 108 process and passes along parameters to the delivery handler 108 to allow the delivery handler 108 to pass messages (e.g., control messages) to its associated TMI 112 and to access the shared memory block 202 (FIG. 2). The newly created delivery handler 108 is bound to its associated TMI 112 and multiple security constraints can be applied to assure the privacy of a streaming session. For example, in some aspects, a delivery handler 108 is run as a unique user, thus isolating the process from other (with the exception of a privileged user, for example, a "superuser"). Further, in some aspects, sandbox techniques can be used to isolate the delivery handler 108 from other delivery handlers and other processes. In some embodiments, the security constraints prevent a compromised delivery handler 108 from accessing sensitive information from other delivery handler 108 sessions. Further, the security constraints include insuring that the shared memory block and related messaging channels are private to a given delivery handler 108. Additionally, the security constraints can include preventing tampering with the streaming session from any other part of the system, including the MPS 104. In general, the security constraints can prevent a compromised delivery handler 108 from compromising other delivery handlers or the computing host 102.

For each new screen frame scraped on a TMI 112, or when an audio sample needs processing, a new control message can be sent to the associated delivery handler 108. The delivery handler 108 consumes the buffer through the shared memory block and passes it to the media pipeline, which is in charge of encoding and packetization of video and audio frames. Once the processing is finished, the delivery handler further relays the final data packets to the gateway 130 to be communicated to the corresponding client endpoint device.

In some embodiments, policy broker 120 monitors messages between a delivery handler 108 and associated TMI 112. Policy broker 120 processes messages through a white list and decides over all the details related to session creation and TMI setup. It can do so by following a set of rules created by a policy manager 134, which is external to the delivery handler 108 and that acts as the decision engine. Some examples of these policies are: processes allowed to be executed inside the associated TMI 112, sensor's proxying or mocking, audio and video input and output capabilities, etc. In some embodiments, non-media related messages are brokered through policy broker 120 before relaying it to the other end for dispatch.

The MPS 104 can keep track of each of the delivery handlers 108 that have been created and uses the feedback from the remote client (e.g., endpoint device 132) to monitor the connection status. If a client incurs a bad network or loses connection, the MPS 104 can wait for a predefined period of time before closing the connection on the server side and freeing all resources related to the delivery handler 108 process. In addition, if the delivery handler 108 or an encoder within delivery handler 108 have an unrecoverable fault, the MPS 104 can create a new delivery handler 108 and reestablish the connection with the client while destroying and freeing resources associated with the previously crashed module. Since each delivery handler 108 is individually connected with a remote client, other clients will not be affected if one of the delivery handlers crashes.

The MPS 104 can change the media processing, encoding and transport parameters in accordance with a global system load. As a non-limiting example, in the case that the overall system is demanding a network bandwidth that is more than what is available, the MPS 104 can request the delivery handlers 108 to decrease the streaming bandwidth and/or increase the media encoding complexity, given that enough processor cycles are available. As another non-limiting example, in the case that the overall system load is very high, the MPS 104 can request the delivery handlers 108 to decrease the encoding complexity at the expense of potentially more network bandwidth consumption. This methodology of operation can be useful in some embodiments by preventing computing host 102 from becoming inaccessible due to unexpected high demand.

Delivery handler 108 can send a control message to the present/active TMIs 112 to request a decrease on their own load. Decreasing load can be achieved by decreasing the display resolution (while maintaining aspect ratio), as resolution exponentially influences rendering and encoding performance. As another non-limiting example, a delivery handler 108 can request the TMI 112 to lower the rendering framerate. This can have a significant impact in the computing host 102 load, as it will inherently decrease the encoding framerate of the computing host.

A delivery handler 108 can achieve content-aware adaptation through additional information provided as feedback by the TMI 112. Such information may include, but is not limited to, the current application being used on the client side and the current action that the user is performing. For example, the delivery handler can encode at a much lower bitrate or quality when the user is fast scrolling through web pages, and then encode at a higher bitrate or quality when the content is settled and the user is reading. During high movement screens, a users eyes are typically more tolerant of errors as compared to looking at static images. Thus, in some embodiments, if TMI 112 detects that the user is scrolling through content, encoding bitrate and quality can be sacrificed in order to and achieve a faster/smoother interaction and better user experience.

In some embodiments, delivery handler 108 can provide content-aware adaptation utilizing profiles that set the video and/or audio encoding quality for applications. As a non-limiting example, a specific profile can be created for a VoIP application and a separate profile for a web browser. Thus, when the user is using the VoIP application, the audio would be encoded at a bitrate targeted specifically for voice which may be different than the bitrate used when the user is watching a video via a web browser. Another example is to have video encoding parameters targeted for an e-mail application, because reading e-mails typically requires high encoding quality and sharper text, but not necessarily high frames-per-second. However, when watching YouTube videos, a higher frames-per-second would typically be desirable in order to maintain video smoothness. Through this type of application parameter profiling, operation of the delivery handler 108 can be optimized to improve the user experience.

In some embodiments, MPS 104 can receive and process control commands from third-party modules. As a non-limiting example, the MPS 104 can be controlled by a system monitor (not shown) that communicates with other critical OS services to provide high-availability of the service. For example, adapting the video quality to an endpoint device as described above may allow a critical OS component to operate at a required or desired level.

In some embodiments, due to the individual nature of the managed TMIs, a TMI 112 can be "attached" to the MPS with different media properties, such as width, height, depth, or audio capabilities. This allows for a more flexible support of endpoint devices, which can range from handheld portable devices (smartphone, tablets) to desktop computers or smart TVs. For example, as discussed above, the TMI can be specialized and adapted to a user or user's particular endpoint device. As an example, the adaptations can be directed to a user's smartphone screen resolution or scaled version of the screen resolution.

Figure 3:
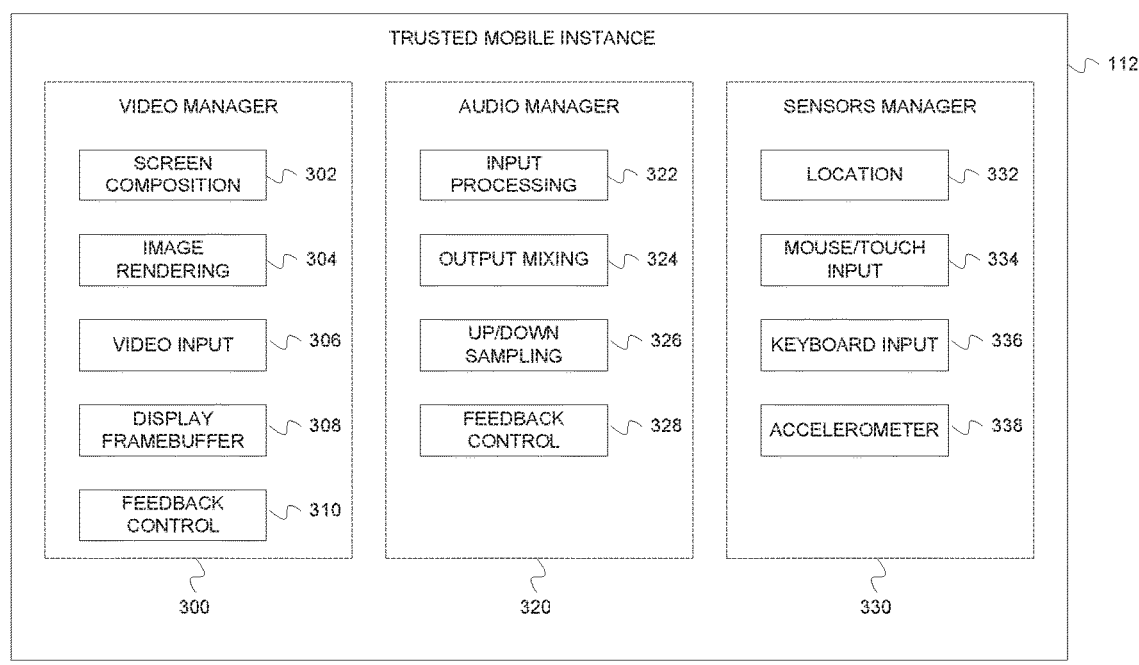
FIG. 3 is a block diagram illustrating a trusted mobile instance according to embodiments.

FIG. 3 is a block diagram illustrating components of a trusted mobile instance 112 according to embodiments. In some aspects, TMI 112 can include a video manager 300, audio manager 320 and sensors manager 330. A description of the various sub-components of video manager 300, audio manager 320 and sensors manager 330 will now be provided.

Screen Composition 302 comprises a composition of the different layers of rendered UI elements.

Image rendering 304 comprises a rendering of the visual components of the UI elements.

Display framebuffer 308 provides management of the framebuffer that is ready for screen scraping.

Feedback control 310 adjusts or tunes the framerate and/or resolution according to the associated delivery handler 108.

Video input 306 manages video returned from the endpoint device 132 such as a camera device.

Input processing 322 comprises a processor that transcodes the input audio signal from the microphone of the endpoint device 132.

Output mixing 324 comprises a processor that transcodes and compounds multiple sounds into one or more channels. During such processing, the audio signal level and frequency may be modified.

Up/Down sampling 326 comprises a processor that converts the audio signals to a defined frequency to allow playback on one or more speakers, or processing by other internal modules and components.

Feedback control 328 adjusts or tunes the aspects of audio data according to the associated delivery handler 108.

Location 332 receives and process location based data. Such data may include GPS data received from an endpoint device 132. Alternatively, the location data may be based on distance of the endpoint device 132 from one or more transmission sources (e.g., mobile phone towers etc.).

Mouse/Touch input 334 receives and processes data from a mouse or touchpad of an endpoint device 132.

Keyboard input 336 receives and processes data from a keyboard (virtual or physical) device of an endpoint device 132.

Accelerometer 338 receives and processes data from one or more accelerometers on an endpoint device 132.

Figure 4:
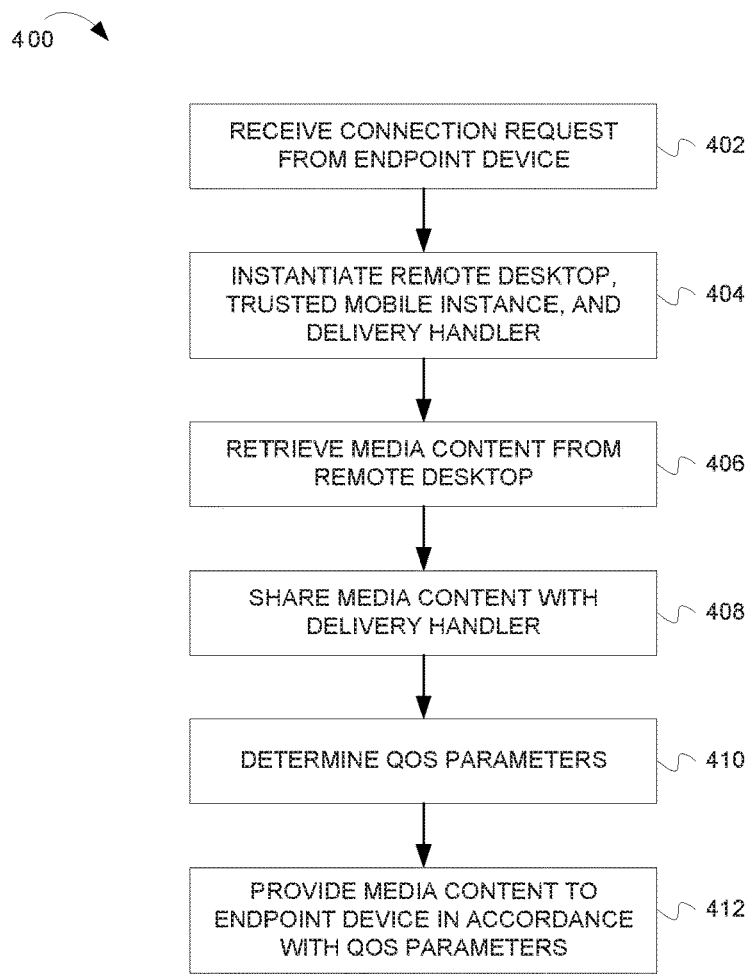
FIG. 4 is a flow chart illustrating operations of a method for providing a remote desktop media content to an endpoint device.

FIG. 4 is a flow chart 400 illustrating operations of a method for providing a remote desktop media content to an endpoint device. At block 402, a computing host 102 receives a connection request from an endpoint device 132. The endpoint device can be a desktop computer, laptop computer, tablet computer, smartphone, or any other device having networking and processing capability.

At block 404, in response to receiving the connection request, the computing host 102 establishes a remote desktop, a trusted mobile instance 112, and a delivery handler 108.

At block 406, the trusted mobile instance 112 obtains media content from the remote desktop. The media content can be image data (e.g., an image of a screen of the remote desktop) or audio data (e.g., audio produced by an application executing on the remote desktop).

At block 408, the trusted mobile instance 112 shares the media content with its associated delivery handler 108. As discussed above, in some aspects, the media content can be shared using a memory buffer that is shared between the trusted mobile instance and the delivery handler. However, other sharing techniques now know or developed in the future can be used. For example, the trusted mobile instance may pass data packets or messages containing the media content to the delivery handler.

At block 410, the delivery handler determines QoS parameters. The QoS parameters can include an encoding rate, an encoding format, a rendering or frame rate, screen resolution, etc. The QoS parameters can be adapted based on a current system load or network load.

At block 412, the media content is provided to the endpoint device in accordance with the QoS parameters.

Figure 5:
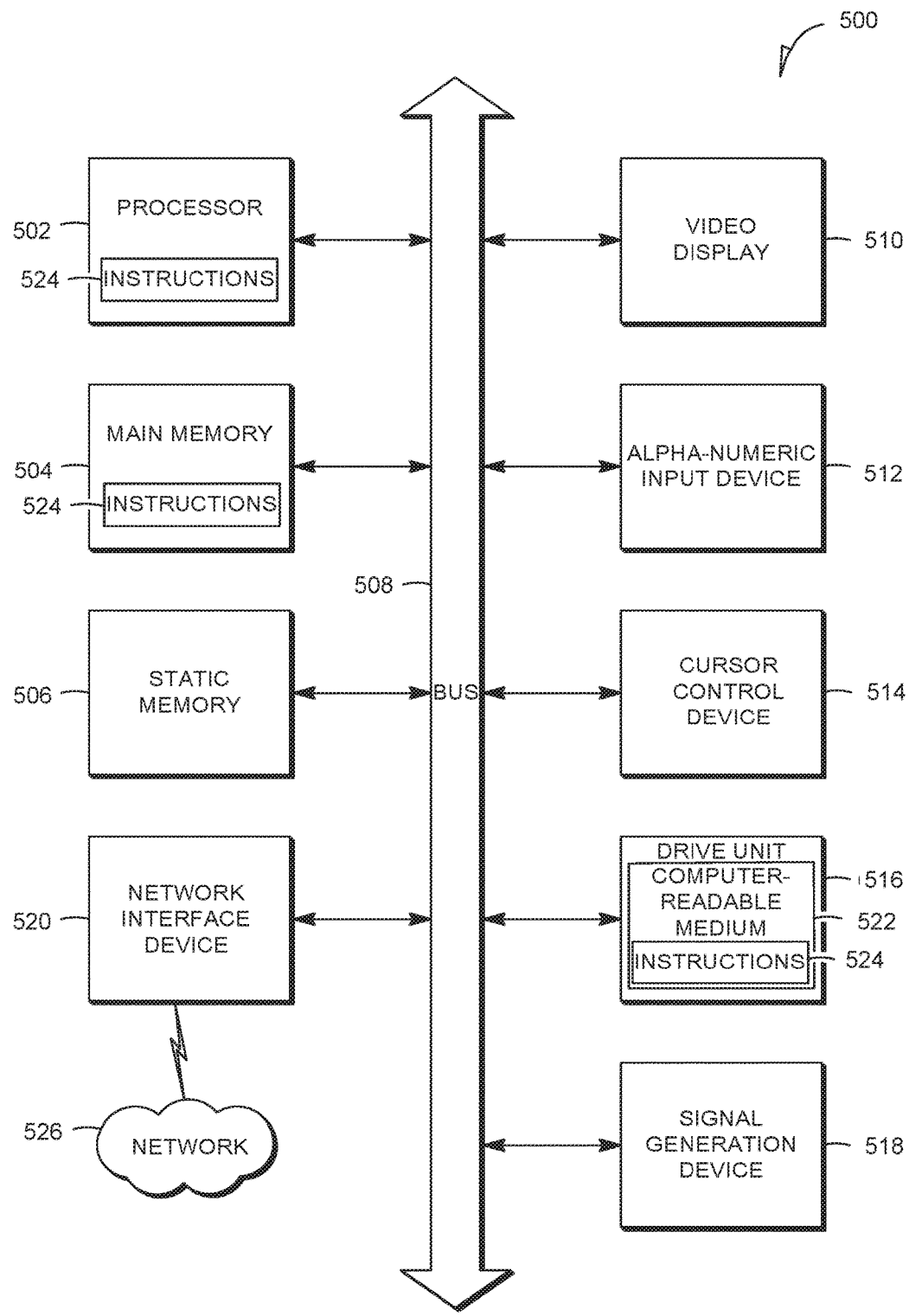
FIG. 5 is a block diagram of an example embodiment of a computer system upon which embodiments of the inventive subject matter can execute.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for providing an adaptive media pipeline, the method comprising:
   receiving, by a computing device, a connection request from an endpoint device;
   in response to receiving the connection request, establishing, by the computing device, a remote desktop, a trusted mobile instance, and a delivery handler, wherein the trusted mobile instance is established within an isolation layer of the computing device and the delivery handler is established within a media pipeline service of the computing device, wherein the isolation layer is comprised of a group of one or more processes segregated from at least one process of the delivery handler, and wherein the group of processes of the isolation layer shares at least one computing resource of the computing device with the at least one process of the delivery handler;
   retrieving, by the trusted mobile instance, media content of the remote desktop;
   sharing, by the trusted mobile instance, the retrieved media content with the delivery handler using a shared memory buffer interconnected between the trusted mobile instance and the delivery handler;
   determining, by the delivery handler, quality of service parameters, wherein said quality of service parameters comprise at least one of an encoding rate, an encoding format, a rendering or frame rate, and a screen resolution; and
   providing, by the computing device via the delivery handler, the media content to the endpoint device in accordance with the quality of service parameters.

2. The method of claim 1, wherein said retrieving media content comprises retrieving image data.

3. The method of claim 1, wherein said retrieving media content comprises retrieving audio data.

4. The method of claim 1, wherein said sharing the retrieved media content with the delivery handler comprising passing data packets or messages containing the media content from the trusted mobile instance to the delivery handler.

5. The method of claim 1, further comprising adapting said quality of service parameters based on a current load of a system employing the method or a network employed by the method.

6. A non-transitory computer readable storage medium comprising a set of instructions for enabling an adaptive media pipeline, the non-transitory computer readable storage medium comprising:
   instructions for receiving a connection request from an endpoint device;
   instructions for, in response to receiving the connection request, establishing a remote desktop, a trusted mobile instance, and a delivery handler, wherein the trusted mobile instance is established within an isolation layer and the delivery handler is established within a media pipeline service, wherein the isolation layer is comprised of a group of one or more processes segregated from at least one process of the delivery handler, and wherein the group of processes of the isolation layer shares at least one computing resource with the at least one process of the delivery handler;
   instructions for retrieving, by the trusted mobile instance, media content of the remote desktop;
   instructions for sharing, by the trusted mobile instance, the retrieved media content with the delivery handler, including instructions that enable a shared memory buffer interconnected between the trusted mobile instance and the delivery handler;
   instructions for determining, by the delivery handler, quality of service parameters, wherein said quality of service parameters comprise at least one of an encoding rate, an encoding format, a rendering or frame rate, and a screen resolution; and
   instructions for providing, via the delivery handler, the media content to the endpoint device in accordance with the quality of service parameters.

7. The non-transitory computer readable storage medium of claim 6, wherein said instructions for retrieving media content comprises instructions for retrieving image data.

8. The non-transitory computer readable storage medium of claim 6, wherein said instructions for retrieving media content comprises instructions for retrieving audio data.

9. The non-transitory computer readable storage medium of claim 6, wherein said instructions for sharing the retrieved media content with the delivery handler comprises instructions for passing data packets or messages containing the media content from the trusted mobile instance to the delivery handler.

10. The non-transitory computer readable storage medium of claim 6, further comprising instructions for adapting said quality of service parameters based on a current load of a system or a network.

11. A system for providing an adaptive media pipeline, the system comprising:
    at least one electronic processor, wherein said system:
      receives a connection request from an endpoint device;
      in response to receiving the connection request, establishes a remote desktop, a trusted mobile instance, and a delivery handler, wherein the trusted mobile instance is established within an isolation layer and the delivery handler is established within a media pipeline service, wherein the isolation layer is comprised of a group of one or more processes segregated from at least one process of the delivery handler, and wherein the group of processes of the isolation layer shares at least one computing resource with the at least one process of the delivery handler;
      retrieves, by the trusted mobile instance, media content of the remote desktop;
      shares, by the trusted mobile instance, the retrieved media content with the delivery handler;
      determines, by the delivery handler, quality of service parameters, wherein said quality of service parameters comprise at least one of an encoding rate, an encoding format, a rendering or frame rate, and a screen resolution; and
      provides the media content to the endpoint device in accordance with the quality of service parameters; and
    a shared memory buffer interconnected between the trusted mobile instance and the delivery handler, wherein said system uses said shared memory buffer to perform said sharing of the media content with the delivery handler.

12. The system of claim 11, wherein said retrieval of media content comprises retrieval of image data.

13. The system of claim 11, wherein said retrieval of media content comprises retrieval of audio data.

14. The system of claim 11, wherein said system shares the retrieved media content with the delivery handler by passing data packets or messages containing the media content from the trusted mobile instance to the delivery handler.

15. The system of claim 11, wherein said system adapts said quality of service parameters based on a current load of said system or a network employed by said system.

\* \* \* \* \*